Patented Dec. 30, 1924.

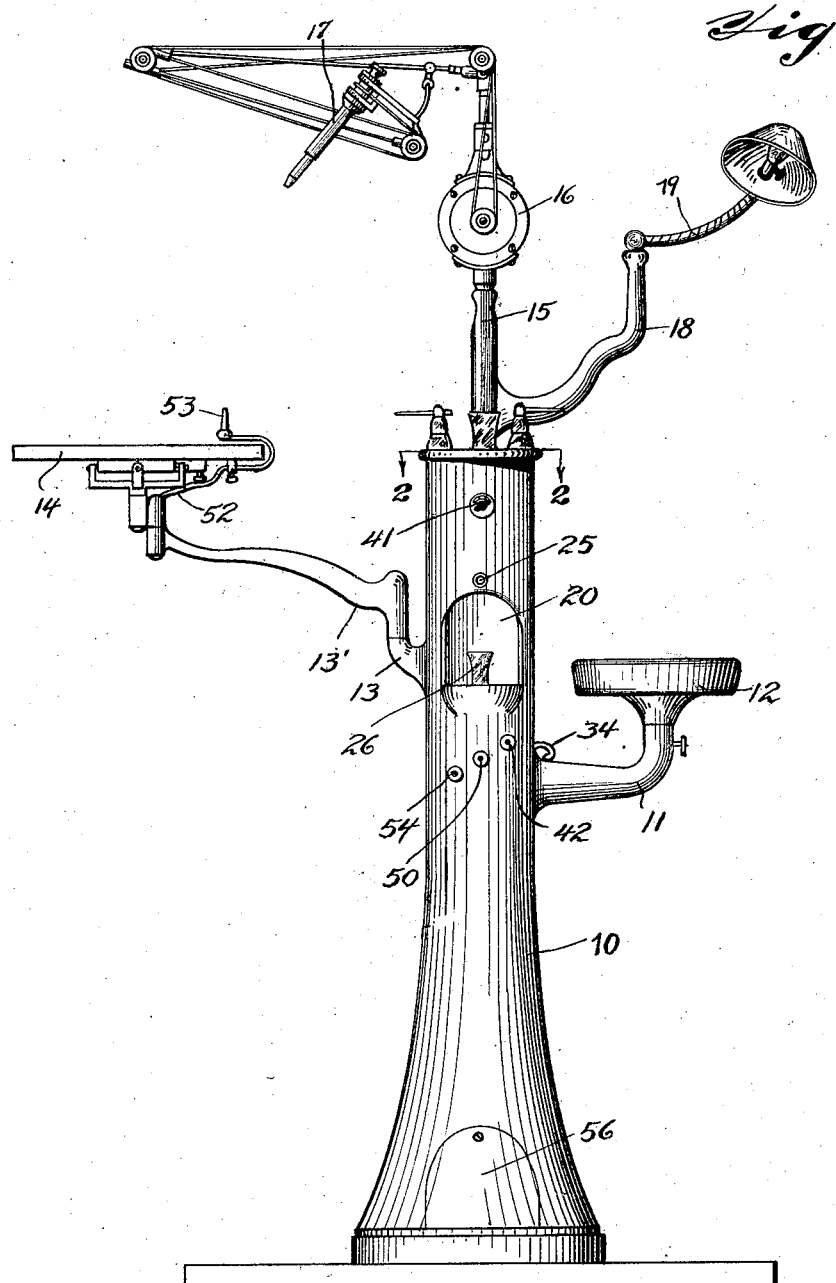

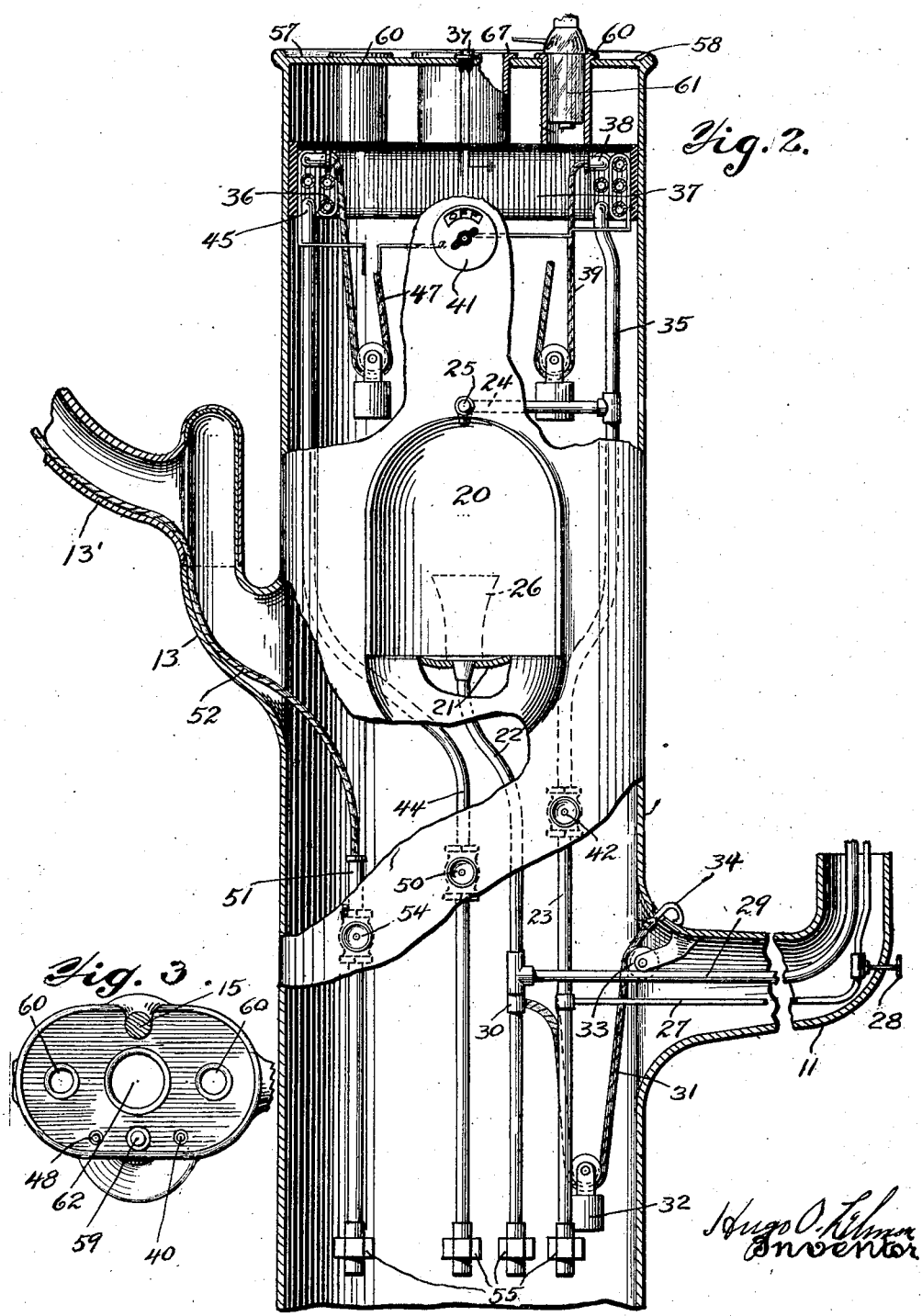

1,520,957

UNITED STATES PATENT OFFICE.

HUGO O. LEHMAN, OF WASHINGTON, DISTRICT OF COLUMBIA.

DENTAL STAND.

Application filed April 7, 1922. Serial No. 550,550.

*To all whom it may concern:*

Be it known that I, Dr. HUGO O. LEHMAN, a citizen of the United States, residing at Washington, in the District of Columbia, have invented certain new and useful Improvements in Dental Stands, of which the following is a specification.

This invention relates to improvements in dental stands and has for its object to provide a work stand for dentists which contains concealed flexible pipe lines constantly required for use.

Another object of the invention is to provide in a dental stand, a heater and implements to be heated thereby and connected by extensible tubing hidden within said stand.

A further object of the invention is to provide in a dental stand hot and cold water, hot air, gas, electric current, etc., all concealed within said stand.

A still further object of the invention is to provide in a dental stand a saliva siphon, having an extensible connection concealed within said stand.

Yet another object of the invention is to provide in a dental stand a built-in cold water supply, hot air and hot water supply, spray receptacles, an electric heater, a drill and motor therefor, an electric lamp pivoted brackets, etc.

With the above and other objects in view which will hereinafter more fully appear I have invented the device illustrated in the accompanying drawing, in which—

Figure 1 is an elevational view of my improved dental stand;

Figure 2 is an enlarged sectional view partly broken away; and

Figure 3 is a top plan view.

Like reference characters indicate like parts throughout the following specification and in the several views in the drawings in which, 10 indicates the body or pedestal of the dental stand made preferably of a hollow enameled casting and having a hollow bracket arm 11 for the cuspidor 12, a hollow extension 13 forming a pivot for a hollow arm 13′ on which is pivoted the implement table 14 and a rigid bracket arm 15 upon which is mounted an electric motor 16 and a drill 17 operated by said motor. Projecting from the bracket 15 is a hollow extension bracket 18 to which a flexible electric light fixture 19 is pivotally connected.

A niche 20 for the cold water supply is provided in the wall of the pedestal, the niche being depressed toward the middle of its floor 21 to which a waste pipe 22 is connected. A cold water supply pipe 23 has an extension 24 terminating over the center of the niche 20 provided with a valve having an operating plug 25 projecting out of the casing for controlling the supply of cold water to the glass 26 in said niche. Connected to the cold water pipe 23 is a branch supply pipe 27 which supplies water to the cuspidor 12 and is controlled by a valve operated by a hand-wheel 28 projecting out of the casing.

Connected to the waste water pipe 22 is a branch 29 leading to the cuspidor 12 and also connected to the waste pipe 22 by means of a connection 30 is a flexible tube 31 which is held normally concealed within the pedestal by means of a counter weight 32. At the free end of this tube, which runs over a pulley 33, there is a saliva siphon 34, an end of which is adapted to be drawn into the stand through an aperture in the bracket 11 when not in use, by the action of said counter weight 32.

A branch 35 of the cold water pipe is connected to a coil 36 heated by an electric heating element 37 held in fixed relation to the pedestal near its upper end and preferably in the form of a bar extending from side to side of the pedestal. The coil is joined at 38 to a flexible tube 39 and supplies hot water to a syringe located in an opening 40 at the top of the pedestal (Fig. 3) if the electricity is turned on in the heating element which may be done by turning a switch 41. A valve 42 having a handle extending outside the stand, serves to cut off the flow of water to the syringe and the cold water tap in niche 20 at the will of the operator. The tube 39 is held down by a weighted pulley 43 but may be lifted by the operator in connection with the use of the syringe and will automatically restore the syringe to its seat when released.

An air pipe 44 in the stand is connected at 45 to a hot air coil also heated by the heating element 37 when the current is turned on. The coil is connected at 46 to a flexible tube 47 having at its free end an air syringe seating at 48 (Fig. 3) and adapted to supply hot air when the current is turned on at 41. A weighted pulley 49 serves to seat the hot air syringe. A valve 50 is provided for cutting off the flow of air which may come from a pump in the pedestal or from a common source for all the offices in a building.

A gas line 51 is connected at its upper end to a flexible tube 52 extending through the hollowing arm 13' of the stand and emerging adjacent the table 14. A Bunsen burner 53 is provided at the outer end of the tube. A valve 54 with a handle outside the stand and a stem journaled, like those of valves 50 and 42, in the wall of the stand serves to cut off the flow of gas when desired.

Each of the pipes 22, 23, 44 and 51 has a union 55 accessible by way of a door 56 at the bottom of the pedestal for connection to the various supply pipe lines.

The stand is provided with a flat top 57 having a rim 58 to give it a finish and has in addition to the features above set forth a button 59 for a call bell (not shown) seats consisting of tubes 60 flanged at their upper ends for support by the table top of the pedestal, these seats supporting a pair of spray bottles of conventional type, one of which is shown at 61, and a seat 62 for a tumbler for water or other fluid which can be kept warm by reason of the proximity of the heating element as can also the contents of the spray bottles.

From the above description it will readily be seen that I have provided in a dentist's stand all of the connections usually required for water, heat, gas, compressed air, etc., all of said connections being normally concealed within the walls of the stand thus eliminating a number of normally exposed flexible pipes such as are found in dentists' stands now in use and which are usually found to be in the way of the operator, yet my stand is extremely simple and inexpensive in construction, and far neater in appearance than the stand in common use.

The stand of my invention and various parts thereof may be modified in numerous respects without departing from the scope of my invention and therefore I do not limit myself to what is shown in the drawings and described in the specification, but only as indicated in the appended claims.

Having thus fully described my said invention, what I claim as new and desire to secure by Letters Patent, is:

1. A device of the character described embracing a hollow pedestal having a table head, an electric heater mounted directly under said head, a water line coiled around said heater and a flexible terminal for said coil.

2. A device of the character described embracing a hollow pedestal having a table head, an electric heater mounted directly under said head, a water line coiled around said heater, and a flexible terminal for said coil, an aperture in said table through which said flexible terminal may project.

3. A device of the character described embracing a hollow pedestal having a table head, an electric heater mounted directly under said head, an air line coiled around said heater and a flexible terminal for said coil.

4. A device of the character described embracing a hollow pedestal having a table head, an electric heater mounted directly under said head, an air line coiled around said heater and a flexible terminal for said coil, and a water line coiled around said heater terminating in a flexible tube adapted to project through one of said apertures.

5. A stand comprising a hollow pedestal having a flat head, and heating means in the pedestal immediately beneath said head for heating devices supported by the head, substantially as set forth.

6. A stand comprising a hollow pedestal having a flat head, tubes depending from the head, an electric heater in the pedestal beneath the head adjacent to the open lower ends of said tubes, and containers for liquids supported by said seats, substantially as set forth.

7. A therapeutical stand comprising a hollow pedestal terminating in a flat head with a central opening through the same adapted to receive a tumbler, and openings near the sides of the head adapted to receive a pair of spray bottles, seats about each opening for holding such containers in position, and electrical means within the pedestal adjacent to the head for heating the liquids in the containers, substantially as set forth.

8. A stand comprising a hollow pedestal having a flat head, tubes depending from the head, an electric heater in the pedestal beneath the head adjacent to the lower ends of said tubes, containers for liquids supported by said seats, an air syringe carried by the pedestal, and means in the pedestal for heating the liquids on said containers said means serving also to heat air for said syringe, substantially as set forth.

9. A stand comprising a hollow pedestal having a flat head, tubes depending from the head, an electric heater in the pedestal beneath the head adjacent to the lower ends of said tubes, containers for liquids supported by said seats, a hot water syringe carried by the pedestal, and means in the pedestal for heating the liquids in said containers said means serving also to heat water for said syringe, substantially as set forth.

10. In a dental stand, a hollow pedestal, an electric heater therein, pipes for air and water leading to said electric heater, flexible tubes leading from said heater to the exterior of the stand, and syringes for hot air and hot water at the free ends of said tubes, substantially as set forth.

11. In a dental stand, a hollow pedestal, an air syringe carried by the pedestal, an air pipe in the pedestal connected to the syringe, and a heater in the pedestal for heating the air in the pipe, substantially as set forth.

12. In a dental stand, a hollow pedestal, a hot water syringe carried by the pedestal, a water pipe in the pedestal connected to the syringe, and a heater in the pedestal for heating the water in the pipe, substantially as set forth.

13. In a dental stand, a hollow pedestal, an electric heater therein, a pipe for air leading to said electric heater, a flexible tube leading from said heater to the exterior of the stand, and a syringe for hot air at the free end of said tube, substantially as set forth.

14. In a dental stand, a hollow pedestal, an electric heater therein, a pipe for water leading to said electric heater, a flexible tube leading from said heater to the exterior of the stand, and a syringe for hot water at the free end of said tube, substantially as set forth.

15. In a dental stand, a hollow pedestal, a waste pipe therein, a flexible tube connected thereto said tube being normally concealed in the pedestal, and a saliva siphon at the free end of the tube, substantially as set forth.

16. In a dental stand, a hollow pedestal, a waste pipe therein, a flexible tube connected thereto, a saliva siphon at the free end of the tube, and means for maintaining the tube normally concealed in the pedestal, substantially as set forth.

17. A dental stand having a hollow pedestal, an integral bracket at one side thereof, an arm pivoted on the bracket, a table carried by the arm, a gas burner on the table, and a gas line extending through and concealed within the pedestal the bracket and the arm and leading to said gas burner, substantially as set forth.

18. In a stand for therapeutical purposes, a hollow pedestal, a water supply pipe and a waste pipe concealed therein, a niche in the body providing a support for a tumbler, a valve-controlled outlet from the supply pipe at the upper end of the niche, and a drain at the lower part leading to said waste pipe, substantially as set forth.

In testimony whereof I affix my signature in the presence of two witnesses.

HUGO O. LEHMAN.

Witnesses:
O. S. SMITH,
ALEX J. WEDCHIL.